Figure 1:
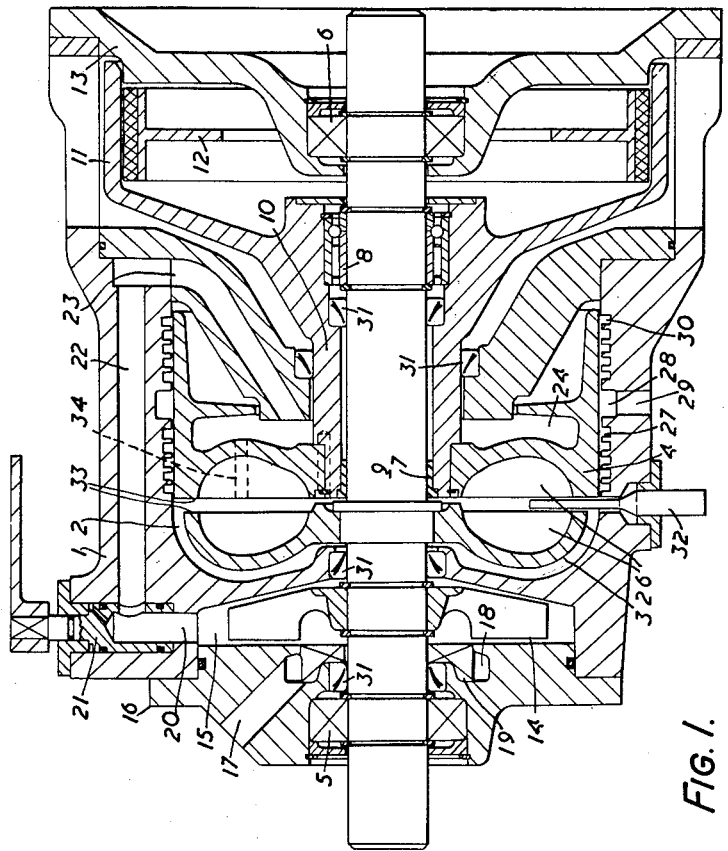

April 17, 1962 I. M. JARVIS 3,029,902
HYDRO-KINETIC BRAKES AND COUPLINGS
Filed July 30, 1958 2 Sheets-Sheet 1

FIG. I.

INVENTOR
I. M. JARVIS
BY
Holcombe, Wetherill & Brisebois
ATTORNEYS

April 17, 1962 I. M. JARVIS 3,029,902
HYDRO-KINETIC BRAKES AND COUPLINGS
Filed July 30, 1958 2 Sheets-Sheet 2

INVENTOR
I. M. JARVIS
BY
Holcombe, Wetherill & Brisebois
ATTORNEYS

United States Patent Office 3,029,902
Patented Apr. 17, 1962

3,029,902
HYDRO-KINETIC BRAKES AND COUPLINGS
Ivor Maurice Jarvis, Worcester, England, assignor to Heenan & Froude Limited, Worcester, England, a British company
Filed July 30, 1958, Ser. No. 752,099
Claims priority, application Great Britain July 31, 1957
9 Claims. (Cl. 188—90)

The present invention relates to hydro-kinetic apparatus, more particularly hydro-kinetic brakes and hydro-kinetic couplings or clutches, and has for an object to provide improved such hydro-kinetic apparatus suitable for use in wheeled vehicles and in industrial and other installations.

The hydro-kinetic method of braking is well known and heretofore it has been proposed to couple the braking member of an hydro-kinetic brake in a permanent manner to the shafting system to be retarded, and the degree of retardation varied either by altering the liquid filling of the brake by known means, or by the interposition of sluice plates between the rotor and stator of the brake. Maximum braking power is approximately proportional to the cube of the speed of rotation of the braking member, and the brake may have to be made of such a size as to give relatively large braking effort at comparatively low speeds, whereas the maximum running speeds may be quite high.

When the braking effort is controlled by either of the means above referred to, the minimum braking effort at high speeds will be appreciable. For example, if 100 H.P. of braking effort is required at 1000 r.p.m. and the maximum speed of the brake under conditions where braking is not required is 4000 r.p.m., the inherent capacity of the brake at this latter speed would be approximately 6400 H.P. Even supposing all the liquid is taken from the brake under these conditions, the air contained in the brake would still give approximately 1/800 of the braking force obtained with water, that is to say, 8 H.P., but, since in practice with no air circulation the brake would heat, it is usually necessary to add some water to keep the brake cool and this again results in an increase in the minimum power absorption at the higher speed. In many applications, such as for instance internal combustion engine driven road vehicles, this implies a serious loss of operating efficiency, since in addition to driving the vehicle, the engine also has to overcome this minimum braking effort.

One way of avoiding such loss of operating efficiency is to provide a clutch between the brake and the shafting system to which it is normally connected. When this arrangement is adopted, the clutch has to accelerate the rotatable parts of the brake before full braking can be applied, and is a complication to be avoided if possible.

According to the present invention, there is provided an hydro-kinetic apparatus comprising a housing defining a fluid pressure chamber and first and second rotors positioned respectively within the said chamber, the said first rotor and second rotor being each freely rotatably supported for rotation independently one from the other.

In the case of an hydro-kinetic brake the first rotor is adapted to be permanently connected to a shafting system to be braked and a means is provided for restraining the second rotor against rotation when braking effort is required.

Conveniently, the second rotor is secured upon a second rotor shaft rotatably supported in the housing and the first rotor is secured upon a further shaft also rotatably supported in the housing. Alternatively, the second rotor may be rotatably supported upon the said further shaft. The said restraining means may comprise a known form of positively applied brake, for example a friction brake, one member of which is connected to the second rotor for rotation therewith and the other member is supported by the housing or other stationary part of the apparatus. Thus, under normal running conditions of the hydro-kinetic brake and when braking is not required, the positively applied brake is disengaged and the fluid contained in the chamber will cause the first and second rotors to interact in the manner of an hydraulic clutch or coupling. However, since the second rotor is free of restraint, it will rotate at a speed approximating that of the first rotor and the amount of power absorbed under these conditions is negligible. When braking is required, the positively applied brake is engaged and the second rotor brought to rest, and the arrangement becomes, in effect, a conventional type of hydro-kinetic brake which can be controlled by known means normally used for the control of the retarding effort of brakes or hydraulic dynamo-meters or by the means hereinafter described.

Figure 2:
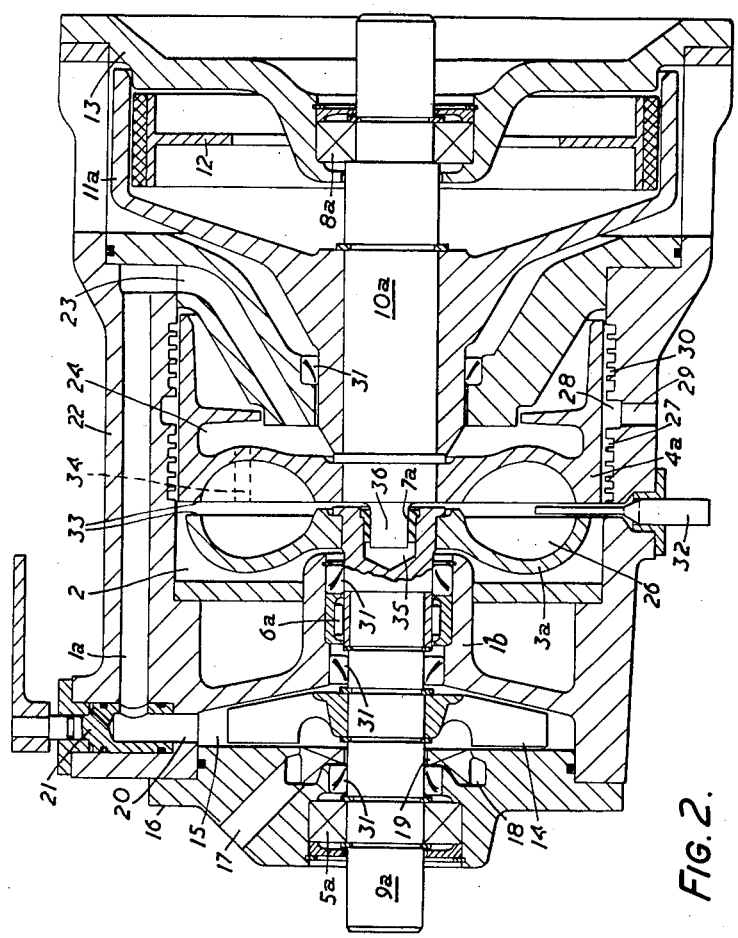

The invention will now be more fully described with reference to the accompanying drawings, in which:

FIGURE 1 is a longitudinal section through an hydro-kinetic brake according to the invention; and FIGURE 2 is an alternative construction of brake which can be employed alternatively as a variable speed coupling.

Referring to FIGURE 1, the hydro-kinetic brake comprises a housing 1 formed to provide a chamber 2 in which are positioned a first rotor 3 and a second rotor 4. The first rotor 3 is secured upon a shaft 9 rotatably supported in end plates 16 and 13 by bearings 5 and 6 respectively. The second rotor 4 is secured to a sleeve 10 rotatably supported on the shaft 9 by bearings 7 and 8. The first rotor 3 and second rotor 4 which are preferably, though not necessarily, of conventional "Froude" pattern have vanes 33 set at 45° to the plane of the opposing rotor faces and inlet ducts 34 are formed in the vanes 33 for admitting fluid to the working compartments 26 formed in the first and second rotors 3 and 4 respectively. Alternatively, the inlet ducts may be formed in any other convenient part of the second rotor. Attached to the sleeve 10 is the drum 11 of a drum-type friction brake, the non-rotating member 12 of which together with required operating gear (not shown) is attached to the end plate 13.

A vaned pump 14 is supported upon the shaft 9 for rotation therewith and rotates in a chamber 15 formed by the housing 1 and the end plate 16. The pump inlet is provided by a fluid passage 17 leading to an inlet compartment 18 having straightened vanes 19 positioned therein. Fluid from the pump chamber 15 flows through passages 20, 22 and 23 to a fluid inlet compartment 24 formed at the back of the second rotor 4 and from which fluid flows through the inlet ducts 34 to the working compartments 26. A valve 21 is interposed between the passage 20 and the passage 22 for controlling the flow of fluid from the pump to the working compartments. Labyrinths 27 and 30 are formed in the housing 1 on each side respectively of an outlet annulus 28 and outlet passage 29, and suitable seals—as indicated for example at 31—are provided at all necessary points. The labyrinths 27 and 30 are each formed by a plurality of annular grooves in the portion of the housing surrounding the second rotor 4, the said grooves being axially spaced to provide lands therebetween which are spaced from the peripheral surface of the second rotor to provide a clearance, which in conjunction with the annular grooves provides a resistance to the flow of fluid between the housing and the second rotor, which fluid flow will vary from laminar to fully turbulent flow according to the amount of said clearance. A vent passage 32 extends through the clearance space between the opposing faces of the rotors 3 and 4 to the centre of the working compartments or cups 26 thereby permitting a maximum controllable range of torque to be obtained and also a quick response to changes in the fluid filling of the cups 26.

In operation of the hydro-kinetic brake, when fluid passes through the space between the first rotor 3 and second rotor 4, it is entrained in the vortex set up by the interaction of the rotors 3 and 4. By reason of the pressure thus generated the fluid is then discharged into the annular space of the chamber 2, surrounding the first rotor 3 and from thence through the labyrinth 27 which constitutes a restricted outlet path to the outlet annulus 28, the pressure of the fluid being reduced in a controlled manner by the action of the labyrinth 27. The labyrinth 30 prevents excessive recirculation of fluid from the outlet annulus 28 back to the inlet compartment 24, under conditions where the fluid pressure in the outlet annulus is greater than that in the inlet compartment. Conversely, the labyrinth 30 prevents excessive leakage of fluid from the inlet compartment 24 to the outlet annulus 28 and/or to the chamber 2 when the fluid pressure in the inlet compartment 24 is greater than that in the annulus 28 and/or the chamber 2.

For a given speed of rotation of the first and second rotors, the torque transmitted from the first rotor to the second rotor, will depend upon the degree of fluid filling of the rotor cups 26, which in turn depends upon the fluid pressure in the chamber 2. Thus, by providing means such as the control valve 21 for variably controlling the rate of flow of fluid into the cups 26 of the second rotor, the fluid pressure generated in chamber 2 can be controlled so as to maintain an outflow of fluid through the labyrinth 27 at the same rate as the inflow of fluid to the cups 26 of the second rotor. This in turn will control the fluid filling of the cups 26 and hence the torque transmitted from the first rotor 3 to the second rotor 4. When the control valve is fully open the pressure generated in the chamber 2 will be a maximum and consequently the fluid filling of the cups and the torque transmitted will also be a maximum. Conversely, when the control valve is fully closed the pressure generated in the chamber 2 will be a minimum and the fluid filling of the cups and the torque transmitted will also be a minimum. For maximum operating efficiency of the brake the resistance of the labyrinth 27 to fluid outflow is designed to ensure complete fluid filling of the cups 26 when the maximum quantity of fluid is flowing through the brake. Furthermore, the maximum fluid flow must also be sufficient to prevent overheating when the apparatus is working under maximum capacity conditions.

When the positively applied brake is not in use and the second rotor is thus free to rotate the apparatus can be used as a variable speed clutch or coupling by providing a driving connection between the second rotor and a driven member and in this case the torque transmitted by the driving member to the driven member and/or the differential speed between the driving and driven members is controlled by varying in known manner or in the manner hereinafter described the fluid filling of the torque transmitting elements.

One arrangement of hydro-kinetic brake which can alternatively be used as a variable speed clutch or coupling is shown in FIGURE 2 in which the second rotor 4a is secured upon one end of a shaft 10a supported at the other end in a bearing 8a in the end plate 13. The first rotor 3a is secured upon one end of a shaft 9a, the other end of which is supported in a bearing 5a in the end plate 16. The shaft 9a is also supported intermediate its length by a bearing 6a mounted in a hollow bushing 1b formed integral with the housing 1a, the shaft 9a being provided at the said one end thereof with a recess 35 which accommodates a bearing 7a supporting a reduced end portion 36 at the said one end of the shaft 10a. The drum 11a of the brake is also secured on the shaft 10a.

In employing the construction of FIGURE 2 as a hydro-kinetic brake, the shaft 9a is connected to the shaft or other rotating system to be braked, the shaft 10a being left free so that when the friction brake is engaged, the second rotor is brought to rest and prevented from rotating and the braking effort exerted by the hydro-kinetic brake is varied by suitably adjusting the valve 21 to control the fluid flow into the chamber 2.

When it is required to use the construction of FIGURE 2 as a hydro-kinetic coupling, the friction brake is disengaged, the shaft 9a is connected to a driving shaft or member and the shaft 10a to a shaft or member to be driven and the speed of the driven shaft or member and/or the torque transmitted from the driving shaft or member to the driven shaft or member can be varied at will within the torque range of the coupling or clutch by varying the rate of fluid flow through the chamber 2.

The control valve 21 and the stationary member 12 of the friction brake are provided with known mechanical, hydraulic or electrical operating gear (not shown) arranged to ensure the correct sequence of operations. Thus when braking torque is required the friction brake is engaged and the second rotor brought to rest and the control valve is then progressively opened until the desired value of braking torque is obtained. Conversely, when braking torque is not required the control valve is progressively closed and the friction brake disengaged to allow the second rotor to accelerate to a speed approaching or equal to that of the first rotor. Under this condition the braking torque on the first rotor shaft will be negligible.

In order to obtain quick response to changes of fluid filling of the hydro-kinetic brake or coupling and to obtain the maximum controllable range of torque, the vent passage 32 is provided although the brake or coupling will, however, function satisfactorily without this vent passage, but the range and rate of response of controllable torque may be reduced.

In certain applications of the hydro-kinetic brake or coupling it may be desirable for the torque transmitted from the first rotor to the second rotor to be proportional to the square of the first rotor speed. The said torque characteristic is obtained when the fluid pressure in the chamber 2 is developed at a rate equal to the square of the speed of rotation of the first rotor. Thus by providing the chamber 2 with a restricted outlet path having a flow rate proportional to the square root of the first rotor speed, and by supplying fluid to the hydro-kinetic brake or coupling at a rate proportional to the first rotor speed, the desired pressure and torque characteristic can be obtained. One arrangement that has been successfully employed to give the said pressure and torque characteristic is by forming the labyrinth 27 by a plurality of grooves of square section ⅛" x ⅛" and axially spaced at 3/16" pitch to provide lands 1/16" wide and having sharp corners. The minimum radial clearance between the lands and the periphery of the second rotor 4 is not less than .010" to avoid the possibility of a transition to laminar flow through the said clearance. The rate of flow through this labyrinth is proportional to the square root of the pressure developed in the chamber 2 and since the pump 14 delivers fluid to the brake or coupling at a rate proportional to the speed of the first rotor, the aforemetnioned torque characteristic is obtained. It will be appreciated that by using other known means for varying the fluid filling of hydro-kinetic brakes or couplings, similar or other torque characteristics can be obtained to suit various practical requirements. Thus, for example, the valve 21 can be controlled by means responsive to the torque or to the first rotor speed to give a desired torque characteristic. Further, the means of supplying fluid to the chamber 2 is not restricted to a pump rotating at a speed proportional to the speed of the first rotor, but may comprise a suitable form of fixed speed pump, or other suitable pressurised means in which a pump may or may not be used.

As previously stated, it is necessary to supply the hydro-kinetic brake or coupling with fluid at a rate sufficient to extract the heat generated therein. It is further necessary to provide the brake or coupling with some form of external circulating system in which the said heat can be dissipated.

When using the apparatus as an internal combustion engine driven vehicle brake it can be operatively connected to the power transmission shafting between the engine and road wheels, and the fluid circuit of the brake can be connected to the engine jacket cooling system. The heat generated in the brake can either be dissipated in the normal manner or used to maintain correct working temperatures in the engine cylinder jackets during the descent of a long incline and/or to supply heat to the heating system of a passenger vehicle, or any other vehicle in which heating is required. Furthermore, when starting up a vehicle after standing in cold climatic conditions, any heating system dependent upon waste heat from the engine can take considerable time before it is of real benefit. It is therefore proposed that when hydro-kinetic braking is available, this should be used after the cold start of the engine and the heat so generated be fed directly to the vehicle heating system and until such time as the engine jackets are sufficiently warm to revert to the normal heating system. Hydro-kinetic braking can then be discontinued. A secondary benefit of such an arrangement is that the additional power required from the engine to drive the hydro-kinetic brake will speed up the heating of the engine jackets.

Finally, in industrial applications of the hydro-kinetic apparatus according to the invention, the heat generated in the said apparatus can, if desired, be used in any suitable heating system.

I claim:

1. An hydro-kinetic brake comprising a housing, a fluid pressure chamber in said housing, a shaft journaled in said housing and extending through the fluid pressure chamber and adapted to be connected to a system to be braked, a first rotor in said fluid pressure chamber and secured upon the shaft for rotation therewith, a second rotor in said fluid pressure chamber for co-action with said first rotor upon admission of fluid to the chamber and rotatably supported on said shaft, a friction brake connected with said second rotor for restraining said second rotor against rotation on said shaft when braking effort is required, inlet means to said fluid pressure chamber for supplying fluid thereto, a restricted outlet path having a predetermined fluid-flow characteristic and constituting the sole means for discharging fluid from the said fluid pressure chamber, a pump chamber in said housing and surrounding said shaft, an impeller mounted for rotation in said pump chamber and secured on said shaft for rotation therewith, an inlet and an outlet to said pump chamber, duct means connecting the outlet of the pump chamber to the inlet of the fluid pressure chamber and a valve in said duct means for varying the amount of fluid delivered by the pump to the fluid pressure chamber, thereby to vary the braking effort exerted by said second rotor on the first rotor when the second rotor is held stationary by said friction brake.

2. An hydro-kinetic brake as claimed in claim 1 in which the said restricted outlet path is formed between the second rotor and the housing.

3. An hydro-kinetic apparatus comprising a housing, a fluid pressure chamber in said housing, a first shaft journaled in said housing and adapted to be connected to a system to be braked, a first rotor secured on said first shaft for rotation within said fluid pressure chamber, a second shaft journaled in said housing co-axially with said first shaft, a second rotor secured on said second shaft for rotation within said fluid pressure chamber and co-acting with the first rotor upon admission of fluid to the fluid pressure chamber, a friction brake for restraining the second rotor and said second shaft against rotation when braking effort is required, inlet means to said fluid pressure chamber for supplying fluid thereto, a restricted outlet path having a predetermined fluid flow characteristic and constituting the sole means for discharging fluid from said fluid pressure chamber, a pump chamber in said housing and surrounding said first shaft, an impeller mounted for rotation in said pump chamber and secured on said first shaft for rotation therewith, an inlet and an outlet to said pump chamber, duct means connecting the outlet of the pump chamber to the inlet of the fluid pressure chamber and a valve in said duct means for varying the amount of fluid delivered by the pump to the fluid pressure chamber, thereby to vary the braking effort exerted by the second rotor on the first rotor when the second rotor is held stationary by said friction brake.

4. An hydro-kinetic brake as claimed in claim 3 in which the said restricted outlet path is formed between the second rotor and the housing.

5. An hydro-kinetic coupling comprising a housing, a fluid pressure chamber in said housing, a first shaft journaled in said housing and adapted to be connected to a driving member, a first rotor secured on said first shaft for rotation within said chamber, a second shaft journaled in said housing co-axially with the said first shaft and adapted to be connected to a driven member, a second rotor secured on said second shaft for rotation within said chamber and co-acting with the first rotor upon admission of fluid to the fluid pressure chamber to transmit torque from said first to said second shaft, inlet means to said fluid pressure chamber for supplying fluid thereto, a restricted outlet path having a predetermined fluid flow characteristic and constituting the sole means for discharging fluid from the said fluid pressure chamber, a pump chamber in said housing and surrounding said first shaft, an impeller mounted for rotation in said pump chamber and secured on said first shaft for rotation therewith, an inlet and an outlet to said pump chamber, duct means connecting the outlet of the pump chamber to the inlet of the fluid pressure chamber, and a valve in said duct means for varying the amount of fluid delivered by the pump to the fluid pressure chamber, thereby to vary the torque transmitted from said first to said second shaft.

6. An hydro-kinetic brake as claimed in claim 5 in which the said restricted outlet path is formed between the second rotor and the housing.

7. An hydro-kinetic apparatus comprising a housing, a fluid pressure chamber in said housing, a first rotor supported for rotation in said chamber, a second rotor supported for rotation in said chamber independently of the first rotor and interacting therewith upon admission of fluid in the said chamber, friction brake means connected to said second rotor to restrain it against rotation when braking effort is required, inlet means to said chamber for supplying fluid thereto, a restricted outlet path having a predetermined fluid-flow characteristic formed between the said second rotor and the housing and constituting the sole means for discharging fluid from said chamber, a pump chamber in said housing, an impeller mounted for rotation in said pump chamber, drive means for rotating the said impeller at a speed proportional to the speed of rotation of the first rotor, duct means connecting the pump chamber to said inlet means for supplying fluid to said chamber, and valve means in said duct means for varying the amount of fluid delivered to the fluid pressure chamber thereby to vary the braking effort exerted by the second rotor on the first rotor when the second rotor is held stationary by said friction brake.

8. An hydro-kinetic apparatus comprising a housing, a fluid pressure chamber in said housing, a first rotor supported for rotation in said chamber, a second rotor supported for rotation in said chamber independently of the first rotor and interacting therewith upon admission of fluid in the said chamber, inlet means to said chamber for supplying fluid thereto, a restricted outlet path having a predetermined fluid-flow characteristic formed between the said second rotor and the housing and constituting sole means for discharging fluid from said chamber, a pump chamber in said housing, an impeller mounted for rotation in said pump chamber, drive means for rotating the said impeller at a speed proportional to the speed of rotation of the first rotor, duct means connecting the pump chamber to said inlet means for supplying fluid to said chamber, and valve means in said duct means for varying the amount of fluid delivered to the fluid pressure chamber thereby to vary the quantity of fluid in the said chamber with corresponding variation of the interaction between the first and second rotors.

9. An hydro-kinetic apparatus as claimed in claim 8, in which the said restricted outlet path is formed by a plurality of axially spaced annular grooves in the housing and forming therebetween a plurality of lands spaced from the peripheral surface of the second rotor to provide a clearance, which in conjunction with the annular grooves affords a resistance to the flow of fluid to give the said predetermined fluid flow characteristic.

References Cited in the file of this patent
UNITED STATES PATENTS

| | | |
|---|---|---|
| 1,024,982 | Fottinger | Apr. 30, 1912 |
| 1,672,232 | Saives | June 5, 1928 |
| 2,281,118 | Smirl | Apr. 28, 1942 |
| 2,283,842 | Yingling | May 19, 1942 |
| 2,421,056 | Dake et al. | May 27, 1947 |
| 2,429,989 | Buckendale | Nov. 4, 1947 |
| 2,496,497 | Russell | Feb. 7, 1950 |
| 2,748,570 | Booth | June 5, 1956 |
| 2,748,900 | Booth et al. | June 5, 1956 |
| 2,750,009 | Pohl | June 12, 1956 |
| 2,790,518 | Wilson | Apr. 30, 1957 |
| 2,850,122 | Alishouse | Sept. 2, 1958 |
| 2,858,675 | Schneider | Nov. 4, 1958 |
| 2,864,473 | Christenson et al. | Dec. 16, 1958 |
| 2,889,013 | Schneider | June 2, 1959 |
| 2,929,214 | Stump et al. | Mar. 22, 1960 |
| 2,976,960 | Bathhurst | Mar. 28, 1961 |